June 17, 1969  H. K. BURKE ET AL  3,450,943
OVERSPEED CHECKING CIRCUIT
Filed Jan. 9, 1967
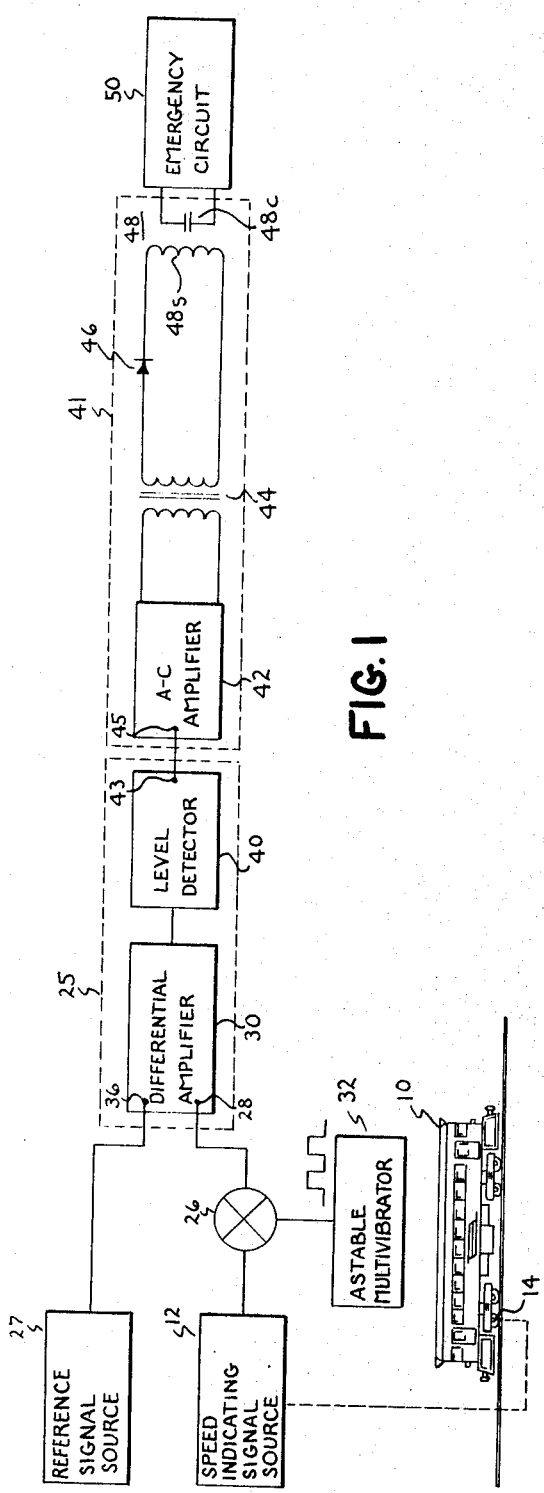
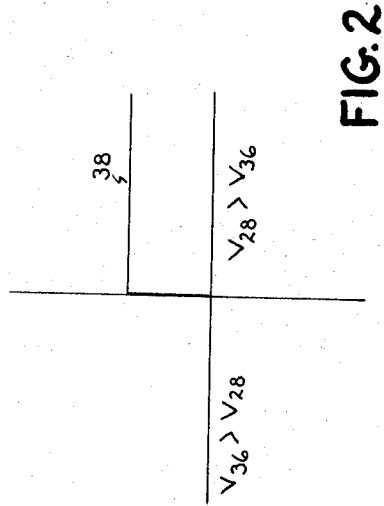
INVENTORS
HUBERT K. BURKE
GERALD J. MICHON
THEIR AGENT 3,450,943
OVERSPEED CHECKING CIRCUIT
Hubert K. Burke, Schenectady, and Gerald J. Michon, Waterford, N.Y., assignors to General Electric Company, a corporation of New York
Filed Jan. 9, 1967, Ser. No. 607,928
Int. Cl. H02h 3/26, 3/04; G08b 23/00
U.S. Cl. 317—5
5 Claims

ABSTRACT OF THE DISCLOSURE

In a vehicle overspeed checking circuit, fail safe operation is provided by adding periodic pulses from an astable multivibrator to direct-current speed-indicating signals from a speed source. When the voltage level of the speed-indicating signals is less than that of maximum speed reference signals from a reference source, the periodic pulses turn a level detector on and off, providing alternating-current output signals which hold an emergency circuit off. However, if either the speed-indicating signal level is greater than the reference signal level or a malfunction interrupts the flow of pulses to the level detector, the level detector provides direct-current output signals which allow the emergency circuit to become actuated.

---

This invention relates to vehicle speed control systems, and more particularly, it relates to fail safe speed control systems having particular application to rapid transit and other railway vehicles.

In many automatic control systems for rapid transit and other railway vehicles, it is common to compare the signal level of signals which are proportional to the actual velocity of a vehicle with the signal level of a reference signal representing a desired velocity of the vehicle. If the signal level of the velocity indicating signals is greater than that of the reference signals, an overspeed condition is indicated and an emergency circuit, such as a brake actuating circuit, is energized to correct the overspeed condition.

Overspeed checking systems of this type, particularly when used on rapid transit and other railway vehicles carrying human passengers, must be fail safe. That is, the common modes of circuit failure should cause the controlled vehicle to slow down and stop, rather than speed up.

It is thus an object of this invention to provide a novel, improved overspeed checking circuit having a fail safe mode of operation.

Briefly stated, and in accordance with one aspect of this invention, first means are provided for comparing the voltage levels of signals from a reference voltage source and signals from a speed indicating voltage source. A unidirectional output signal is provided when the voltage level of the speed indicating signals is greater than that of the reference signals. In order to test the integrity of the overspeed checking circuit, the output signals from an astable multivibrator are added to the speed indicating signals. The voltage level of the astable multivibrator signals must be such that no matter what the voltage level of the speed indicating signals, the sum of the multivibrator signals and the speed indicating signals is a signal having a voltage level greater than that of the reference voltage. As long as the voltage level of the speed indicating signals is less than that of the reference voltage, the astable multivibrator periodically turns on and turns off the first means, providing an alternating-current type output signal which causes an emergency circuit, such as a brake actuating circuit, to be disabled. During the absence of this alternating-current signal, either because the speed indicating signal exceeds the voltage level of the reference voltage or because a malfunction has occurred, the first means ceases to provide alternating-current signals and the emergency circuit is enabled.

The specification concludes with claims particularly pointing out and distinctly claiming the subject matter of this invention. The organization and manner and process of making and using this invention, together with further objects and advantages thereof, may be best understood by reference to the following description taken in conjunction with the accompanying drawings, in which:

FIG. 1 is a schematic diagram in block form showing a preferred embodiment of an overspeed checking circuit made in accordance with this invention;

FIG. 2 shows a graph of the characteristics of the level detector with respect to the relative voltage levels of signals at the input of the differential amplified in FIG. 1.

The overspeed checking circuit shown in FIG. 1 detects the fact that the speed of a vehicle 10 is above a desired level or that failure has occurred in the checking circuit itself.

Speed indicating signal source 12 generates unidirectional voltage signals having a voltage level proportional to the speed of the vehicle 10. The signal source 12 may be coupled either mechanically, magnetically, optically, or by any other appropriate means to an axle 14 of vehicle 10 so as to facilitate the measurement of the actual vehicle speed.

Speed indicating signals from the signal source 12 are coupled through a summing point 26 to means 25 for providing an output signal when the signal level of signals coupled from the summing point 26 is greater than the signal level of signals coupled from a reference signal source 27. In the illustrated embodiment of this invention, signals from the summing point 26 are coupled to an input terminal 28 of a differential amplified 30. Periodic pulses generated by an oscillator circuit 32 are added to the speed indicating signals at the summing point 26. The oscillator 32 may be any of the conventional types which are well known in the art and is shown in FIG. 1 as an astable multivibrator for illustrative purposes only.

The reference signal source 27 provides reference signals equal in magnitude with the speed indicating signals when the velocity of the vehicle 10 reaches a predetermined level. The reference source may, for example, comprise one or more breakdown diode devices which can establish a desired reference voltage level. The reference signals are coupled to a terminal 36 of the differential amplifier 30, where their voltage levels are compared with that of the speed indicating signals at the input terminal 28.

It is an important requirement of this invention that the voltage level of the signals from the summing point 26, as measured at the input terminal 28, periodically exceed the voltage level of the reference signals at the input terminal 36 when the voltage level of the speed indicating signals from the source 12 is lower than the reference signal voltage level. Thus the voltage level of the oscillator signals must be such that the sum of these and the speed indicating signals of the lowest operating level exceeds the reference voltage level. Under this condition, when the speed indicating signals are at a lower voltage level than the reference signals, the differential amplifier 30 in means 25 generates alternating-current type output signals having a frequency equal to the pulse rate of the astable multivibrator 32. The presence of these alternating-current output signals indicates that the vehicle speed is properly below that set by the reference source, and that no malfunction has occurred in the overspeed checking circuit of this invention. However, when the voltage level of the speed indicating signals is greater than that of the reference signals, the amplifier generates output signals which allow emergency action to be initiated.

The output from the differential amplifier 30 is coupled to a level detector 40 which is responsive to the voltage level of the differential amplifier 30 to provide appropriate output signals based upon this level. The combination of the amplifier 30 and the level detector 40, comprising the means 25, may thus have an operating characteristic similar to that shown in FIG. 2. Note that when the voltage level at the input terminal 28 is equal to or greater than the voltage level at the input terminal 36, the means 25 generates an output signal having a magnitude shown by the line 38. When the voltage level at the input terminal 36 is greater than the voltage level at the input terminal 28, there is no output signal from 25.

The output of the level detector 40 is coupled to means 41 for responding to alternating-current signals from 25 to disable an emergency circuit 50. An output terminal 43 is connected to an input terminal 45 of an alternating-current amplifier 42 and from this amplifier to a primary winding of a transformer 44. The alternating-current amplifier 42 and the transformer 44 respond only to alternating-current signals from means 25, blocking any direct-current signals from level detector 43. A secondary winding of the transformer 44 is connected through a rectifier 46 to a solenoid 48S of a relay 48. The normally open relay contacts 48C are connected to the emergency circuit 50, which may comprise a braking circuit for the vehicle 10, the braking circuit being disabled when the contacts 48C are closed. However, when the contacts 48C are opened, the emergency circuit 50 is able to take such emergency action as applying the brakes of the vehicle.

If, during the normal operation of the overspeed checking circuit shown in FIG. 1, the speed indicating signal level is lower than the reference signal level, signifying that the actual speed is lower than the reference speed level, the signals from the astable multivibrator 32 periodically turn on and turn off the level detector 40. The output from the level detector 40, and thus from means 25, is a square wave signal having a pulse repetition rate equal to that of the astable multivibrator 32.

The periodic changes in the signal level of the level detector 40 keep the emergency circuit 50 disabled. These alternating-current type signals are coupled through the amplifier 42 to the transformer 44. Rectified signals in the secondary circuit of the transformer 44 energize the solenoid 48S so that the contacts 48C are closed, and thus the emergency circuit 50 does not initiate emergency action.

Should the speed indicating signal level become equal to or greater than the reference signal level, the level detector 40 provides a direct-current type output signal. This direct-current signal is blocked by the alternating-current amplifier 42 and the transformer 44. For this reason the solenoid 48S is de-energized and the contacts 48C remain open. The emergency circuit 50 can thus provide some desired indication of an overspeed condition or initiate some corrective mode of operation, such as braking.

Should a power supply energizing the components in the checking circuit fail or should a checking circuit component itself fail, or some circuit wiring become open, the emergency circuit 50 is enabled in the same manner as if an overspeed had occurred. With a failure of this type, alternating-current signals cannot be coupled through the transformer 44 to energize the relay 48. In the absence of alternating-current signals, the contacts 48C remain open and the emergency circuit 50 remains actuated.

What we claim as new and desire to secure by Letters Patent of the United States is as follows:

1. For use in a vehicle tractive effort control system which includes a first source for providing speed indicating, unidirectional voltage signals having a signal level proportional to the actual speed of the vehicle; a second source for providing reference, unidirectional voltage signals having a signal level representing the desired speed of the vehicle, and an emergency circuit; a fail safe overspeed checking circuit comprising, in combination:
    (a) first means adapted to be coupled to said first and second sources for comparing the voltage levels of the signals therefrom and providing prescribed unidirectional voltage output signals when the vehicle speed is greater than the desired speed;
    (b) second means for generating periodic signals, and means for adding the periodic signals to the speed indicating signals, the periodic signals having a voltage level such that said first means provides alternating-current signals in response to the sum of periodic signals and the speed indicating signals when the voltage level of the speed indicating signals is less than that of the reference signals;
    (c) third means, coupled to said first means, and responsive to the presence of the alternating-current signals from said first means for disabling the emergency circuit, said third means allowing the emergency circuit to be enabled in the absence of the alternating-current signals.

2. A circuit according to claim 1 wherein said first means includes a differential amplifier which compares the voltage levels of the speed indicating signals and the reference signals and also includes a level detector responsive to the output of said differential amplifier.

3. A circuit according to claim 1 wherein said second means comprises a stable multivibrator which continuously generates periodic pulses during the normal operation of said circuit.

4. A circuit according to claim 1 wherein said third means includes an alternating-current amplifier.

5. In a vehicle tractive effort control system, a fail safe overspeed checking circuit comprising, in combination:
    (a) a first source for providing speed indicating signals having a signal level proportional to the actual speed of the vehicle;
    (b) a second source for providing reference signals having a signal level proportional to a desired maximum speed of the vehicle;
    (c) an oscillator circuit for continuously generating oscillator signals, and first means for coupling said oscillator circuit to said first source so as to combine the speed indicating signals and the oscillator signals;
    (d) second means coupled to said first means and to said second source for comparing the signal level of the combined speed indicating signals and oscillator signals with that of the reference signals and generating a prescribed unidirectional voltage output signal when the signal level of the combined speed indicating signals and oscillator signals is greater than that of the reference signals, said second means thereby generating direct-current type signals when the vehicle speed is greater than the reference speed and generating alternating-current type signals at the frequency of the oscillator signals when the vehicle speed is less than the reference speed;
    (e) emergency circuit means and means for coupling said second means to said emergency circuit means so that direct-current type signals from said second means enable said emergency circuit to initiate some emergency course of action, while alternating-current type signals from said second means cause said emergency circuit means to be disabled.

References Cited

UNITED STATES PATENTS

| | | | |
|---|---|---|---|
| 2,719,911 | 10/1955 | Maenpaa | 246—182 |
| 2,719,912 | 10/1955 | Maenpaa et al. | 246—182 |
| 2,740,108 | 3/1956 | Plympton et al. | 340—263 |
| 2,762,464 | 9/1956 | Wilcox | 317—5 XR |
| 2,838,657 | 6/1958 | Wilcox | 246—182 |
| 3,108,263 | 10/1963 | Sylvander et al. | 340—268 |
| 3,270,199 | 8/1966 | Smith. | |
| 3,334,224 | 8/1967 | Allen et al. | |
| 3,340,951 | 9/1967 | Vitt. | |
| 3,363,096 | 1/1968 | Hughson et al. | |
| 3,402,286 | 9/1968 | Burke et al. | |

JOHN F. COUCH, *Primary Examiner*.

W. M. SHOOP, Jr., *Assistant Examiner*.

U.S. Cl. X.R.

246—182; 317—19; 340—263